United States Patent
Joho et al.

(10) Patent No.: US 10,809,739 B2
(45) Date of Patent: Oct. 20, 2020

(54) METHOD FOR CONTROLLING A ROBOT AND/OR AN AUTONOMOUS DRIVERLESS TRANSPORT SYSTEM

(71) Applicant: KUKA Aktiengesellschaft, Augsburg (DE)

(72) Inventors: Dominik Joho, Kissing (DE); Daniel Meyer-Delius, Munich (DE)

(73) Assignee: KUKA Deutschland GmbH, Augsburg (DE)

( * ) Notice: Subject to any disclaimer, the term of this patent is extended or adjusted under 35 U.S.C. 154(b) by 354 days.

(21) Appl. No.: 15/742,672

(22) PCT Filed: Jul. 8, 2016

(86) PCT No.: PCT/EP2016/001174
§ 371 (c)(1),
(2) Date: Jan. 8, 2018

(87) PCT Pub. No.: WO2017/008895
PCT Pub. Date: Jan. 19, 2017

(65) Prior Publication Data
US 2018/0203460 A1    Jul. 19, 2018

(30) Foreign Application Priority Data
Jul. 10, 2015   (DE) .................. 10 2015 212 932

(51) Int. Cl.
*G05D 1/02*   (2020.01)
*G06K 9/00*   (2006.01)

(52) U.S. Cl.
CPC ....... *G05D 1/0248* (2013.01); *G06K 9/00201* (2013.01); *G06K 9/00208* (2013.01); *G06K 9/00664* (2013.01); *G06K 9/00671* (2013.01)

(58) Field of Classification Search
CPC ............ G05D 1/0248; G06K 9/00664; G06K 9/00201; G06K 9/00671; G06K 9/00208; B25J 9/1664
See application file for complete search history.

(56) References Cited

U.S. PATENT DOCUMENTS

| | | | | |
|---|---|---|---|---|
| 4,583,298 A | * | 4/1986 | Raugh | G01B 11/002 33/1 CC |
| 9,157,757 B1 | * | 10/2015 | Liao | G01C 21/3644 |
| 2015/0015602 A1 | * | 1/2015 | Beaudoin | G06T 7/0004 345/619 |

FOREIGN PATENT DOCUMENTS

DE   102014211948 A1   1/2015

OTHER PUBLICATIONS

Overview of Bayesian sequential Monte Carlo methods for group and extended object tracking, 2014 (hereinafter referred to (Year: 2014).*

(Continued)

*Primary Examiner* — Abby Y Lin
*Assistant Examiner* — Renee LaRose
(74) *Attorney, Agent, or Firm* — Dorton & Willis, LLP (57) ABSTRACT

A method for controlling a robot and/or an autonomous driverless transport system on the basis of a sensor-based identification of objects includes generating. Point pair features of the 2D surface contours on the basis of 2D surface contours of the objects to be identified. A point cloud of the environment is acquired using a distance sensor, a surface normal is estimated for each point, and corresponding point pair features of the environment are generated. In a voting method, environment features are compared with model features to efficiently generate pose hypotheses, which are subjected to an optimization and a consistency check in order to ultimately be accepted or rejected as an acquisition.

16 Claims, 7 Drawing Sheets

(56) References Cited

OTHER PUBLICATIONS

European Patent Office; Search Report in related International Patent Application No. PCT/EP2016/001174 dated Sep. 29, 2016; 6 pages.
Drost et al.; Publication entitled Model Globally, Match Locally: Efficient and Robust 3D Object Recognition published Jun. 2010; 8 pages.
Feng Lu et al.; Publication entitled Robot Pose Estimation in Unknown Environments by Matching 2D Range Scans published Jun. 1994; 38 pages.

* cited by examiner

METHOD FOR CONTROLLING A ROBOT AND/OR AN AUTONOMOUS DRIVERLESS TRANSPORT SYSTEM

CROSS-REFERENCE

This application is a national phase application under 35 U.S.C. § 371 of International Patent Application No. PCT/EP2016/001174, filed Jul. 8, 2016 (pending), which claims the benefit of German Patent Application No. DE 10 2015 212 932.2 filed Jul. 10, 2015, the disclosures of which are incorporated by reference herein in their entirety.

TECHNICAL FIELD

The present invention relates to a method for controlling a robot and/or an autonomous driverless transport system, and a corresponding transport system.

BACKGROUND

A large number of devices and methods allowing the identification of objects by means of sensors are known as state-of-the-art. The sensor-based identification of objects can be useful for a variety of applications. Parts produced in a mass production process can be automatically examined for specific features, for example, in order to detect errors or defects. Sensor-based object identification is also useful in connection with manipulators such as industrial robots, for example, to permit automatic gripping or handling of objects by means of a manipulator. Safe sensor-based object identification is also important in the control of autonomous driverless transport systems. In this case, object identification can be used for locating transport goods in a logistics scenario, for example, or to enable the targeted and autonomous control of objects.

An optical inspection system, with which manufactured objects (e.g. components) can be inspected for errors and defects, is previously known from DE 10 2014 211 948. A camera, for example, which provides a three-dimensional point cloud of the objects to be identified, should be used for object identification. The point cloud should be a group of three-dimensional points on the surface of a solid object, and can also be derived from CAD volume models, for example. In order to be able to identify objects in the environment, the three-dimensional point clouds provided by the camera are compared with previously known point cloud templates, so as to, for example, be able to identify previously stored objects.

A method for the sensor-based identification of three-dimensional objects is also previously known from the publication "Model Globally, Match Locally: Efficient and Robust 3D Object Recognition" by Bertram Drost, et al. A three-dimensional point cloud is generated in this previously known method as well, and in each case two points on the surface of the point cloud are combined to form point pair features. The point pair features are formed from specific geometric parameters of the two selected points, such as the distance between the two selected points and the angle of the normal to the distance line between the two points. This process is relatively complex, however, because it requires three-dimensional image processing, among other things, and a large number of point pair features have to be considered. In addition, the ultimate decision whether a detection hypothesis is accepted or rejected is based solely on a voting and clustering method, which is considered to be not robust enough for the application scenario of the present invention.

It is therefore an object of the present invention to provide an improved method for controlling a robot and/or an autonomous driverless transport system, with which a reliable and simple identification of objects is possible with minimum effort to enable a suitable control. A new method for deciding the acceptance or rejection of a detection hypothesis is presented as well. Taking into account physical and geometric properties of the measurement process, said method checks whether the detection hypothesis is consistent with the obtained measurement data. Furthermore, the voting method presented here differs from the method in the aforementioned publication of Drost et al.

SUMMARY

The aforementioned object is achieved with a method for controlling a robot and/or an autonomous driverless transport system as described and claimed herein.

The aforementioned object is in particular achieved by means of a method for controlling a robot and/or an autonomous driverless transport system in which an improved sensor-based identification of objects is used. As a first step, an object model of an object to be identified is provided in the form of a 2D surface contour. This can preferably be accomplished by means of a manual or an automatic processing of a CAD model of the object to be identified. The object model can, for example, be a set of geometric primitives, such as circles, polygons, etc., which have a defined inner and outer side. The object model thus advantageously corresponds to a reduction of the object to be identified onto a representation, which can be identified, for example by the sensor to be used later. In the case of a horizontally mounted 2D laser scanner, for example, this can be a horizontal section through the object at the level of the laser scanner. In addition, an object reference pose to be defined as desired is preferably provided for the object model of the object, which can for example but not necessarily correspond to the coordinate origin with orientation zero used in the CAD model.

The object model in the form of a 2D surface contour can be stored in a database, for example, which can be arranged remotely, for example, or is synchronized with a remote database, and which thus makes the data available to a wide variety of users or applications. If the method is used in conjunction with autonomous driverless transport systems, for example, the transport systems or the control devices of the transport systems can access the database, which may be located in a computing center, for example wirelessly, and retrieve the required data. Multiple transport systems can thus access the same data, which, for example, considerably simplifies the updating of the data being used.

A model point cloud is generated from the object model, for example, by placing points (model points) at configurable, regular intervals on the 2D surface contour (or the 2D contours) of the object model. Each of these points is associated with a surface normal, which corresponds to the surface normal of the 2D surface contour at this location. The model point cloud corresponds to this set of oriented points generated in this way.

As a further step, point pair features are formed on the basis of the model point cloud (i.e. based on the 2D surface contour). To do this, for example, a subset of all possible point pairs of the model points is considered. This subset can be randomly or systematically selected, for example. For each point pair of this subset, a point pair feature $f=(d_{12}, \alpha_1, \alpha_2)$ is formed. The point pair features are based at least on the distance $d_{12}$ between the points $P_1$ and $P_2$ of a point pair and the two angles $\alpha_1$ and $\alpha_2$ of the surface normal of each of the points to the distance line between the two points. Depending on the complexity of the object to be identified, several 1,000 or several 10,000 point pair features of a 2D surface contour, for example, can be formed.

A feature pose is also preferably assigned on the basis of a point pair feature as follows: a point M is defined, which lies on the center of the connecting line between the points of a point pair, for example. In addition, a direction vector between M and one of the points of the point pair is defined. The position component of the feature pose is obtained as the point M and the orientation component is obtained as the orientation of the direction vector. Furthermore, for the respective point pair feature, the relative object pose (i.e. the object reference pose) of the object to be identified relative to the feature pose is defined. The point pair features of the 2D surface contour of the object to be identified (also referred to herein as "model features") are thus linked to a relative object pose.

The model features (including the relative object poses) could optionally also be precalculated and, like the 2D surface contour, stored in a database, which can be arranged remotely, for example, or could be synchronized with a remote database.

As a further step, at least one 2D point cloud of the environment (environment point cloud) is acquired by means of a distance sensor, and corresponding point pair features of the acquired 2D point cloud of the environment are formed, i.e. the point pair features are formed in the same way as the model features. A surface normal is thus estimated for each point analogously to the point pair features. The environment point cloud thus consists of a set of oriented points, for example. The distance sensor is generally preferred to be a laser scanner, most preferably a 2D laser scanner. The point pair features of the 2D point cloud of the environment formed in this way are compared with the point pair features of the 2D surface contour (the model features) and similar point pair features are identified. On the basis of the point pair features determined to be similar, it is then determined, preferably by means of a voting method, whether the object to be identified has been identified or not, and the robot and/or the autonomous driverless transport system is accordingly controlled in order to grab the identified object, for example, or to move toward said object.

The step of comparing the point pair features preferably comprises a determination of pose hypotheses of the object to be identified on the basis of the point pair features determined to be similar. For example, on the basis of the environment point cloud, or on the point pair features resulting therefrom, hypotheses about the pose of the object to be identified are generated in the course of a voting method (so-called pose hypotheses).

The voting method can preferably be carried out as follows: As a first step, point pair features of the 2D point cloud of the environment are generated or determined, that all originate from exactly one point (reference point). To do this, a subset of the environment point cloud is selected, for example, and each point of this subset participates as a reference point in a voting method to generate pose hypotheses. The respective reference point is preferably paired with other points of the environment point cloud and, for each such point pairing, a point pair feature is calculated in the same way as the point pair features of the model point cloud used for comparison. These point pair features are also referred to in the following as environment features. In contrast to the model features, however, the environment features are not associated with a relative object pose, because the determination of the object pose is specifically the purpose of the voting method. For this purpose, similar model features are sought for each environment feature generated in a voting method and for each similar model feature found a transformation is determined, which displays the feature pose of the model feature on the feature pose of the environment feature. The relative object poses associated with the model features are transformed into this scene by means of the respective transformation, thereby generating preliminary pose hypotheses.

The pose hypotheses are then preferably entered into a voting grid. The voting grid is in turn a partitioning of the pose hypothesis space into discrete cells, whereby the cells contain the (preliminary) pose hypotheses that fall within them. The voting grid is preferably efficiently implemented by means of a hash table, whereby the key corresponds to the three-dimensional cell index, which in turn corresponds to a discretization of the pose hypotheses. Once all the preliminary pose hypotheses, which in this step are all preferably based on one and the same reference point, are entered into the voting grid, at least one preliminary pose hypothesis is selected from the voting grid and defined as the resulting pose hypothesis of the voting method. Preferably only the cell with the most pose hypotheses is considered for this purpose, and one pose hypothesis (is) preferably randomly selected from the poses contained in this cell. The other pose hypotheses of the voting grid are discarded and not considered. The voting grid is subsequently deleted.

The voting method by means of the voting grid is preferably repeated independently for several reference points, so that several resulting or probable pose hypotheses are determined. However, the quantity of resulting pose hypotheses found in this way is considerably smaller than the quantity of all the preliminary hypotheses ever entered into the voting grids. Since the resulting or probable pose hypotheses selected in this way have emerged as a result of consensus formation during the voting method (e.g. in each case selected from the voting grid cell with most poses), they are more probable hypotheses, in the sense that the actual object pose has a greater probability of being in the vicinity of a resulting (probable) pose hypothesis than on a randomly selected preliminary pose hypothesis. As a result of this reduction of the quantity of pose hypotheses, the subsequent processing steps, with which the resulting pose hypotheses are preferably further optimized and subjected to a consistency check, are accelerated.

In an advantageously subsequent optimization step, the pose hypotheses resulting from the respective voting methods are changed with the intent to increase the accuracy of the pose estimation even more. This is preferably carried out by means of an Iterative Closest Point Method (ICP) in which, in each sub-step of the method, the points of the environment point cloud are associated with the respective closest point of the points of the model point cloud transformed into the scene. Points are preferably associated only if the distance of the points does not exceed a given limit value, and the angular difference between the surface normals of the points does not exceed a given limit value. On the basis of the points associated in this way and by means of a singular value decomposition, a new pose hypothesis, which minimizes the sum of the squared point distances of the respectively associated points, can efficiently be found. This new thus determined pose hypothesis is the starting point for the next iteration of the ICP method, which is carried out until convergence or until a given maximum number of iteration steps for the pose hypothesis has been reached.

In the course of determining whether the object to be identified has been correctly identified or not, the resulting and optionally optimized pose hypotheses are preferably subjected to a consistency check in order to identify false hypotheses as such and discard them. The consistency check can be based on a variety of individual criteria, which can be used individually or also cumulatively. In the following, it is assumed that the object model has been transformed into the pose of the respective pose hypothesis to be tested, and the points of the environment point cloud have been associated with the points of the transformed 2D surface contour or the corresponding model point cloud. In doing so, an environment point is associated with the closest model point of the 2D surface contour—but only if the distance of the points and the angular difference of the surface normals of the points do not exceed a particular limit value.

A first criterion is based on the free space model of the object, which is interpreted as a region within which no objects other than the object itself are expected to be. The object model of a table, for example, could consist of four circles that model a horizontal section through the table legs at the level of the distance sensor, and the free space model could be a rectangle that encompasses these four circles. If an attempt is made to identify this four leg table and it is erroneously assumed to be at a pose at which there is actually a similar table, but with six legs, the additional two legs would result in measurements that, on the one hand, lie within the free space model of the four leg table, but that, on the other hand, cannot be associated with model points of the four leg table. The first criterion is therefore based on a limit value for the number of points of the environment point cloud that are located within the free space model of the object and that could not be associated with model points. In other words, the sensor acquires points at positions at which, if the pose hypothesis is correct, there should be none. If this limit value is exceeded for a given pose hypothesis, the pose hypothesis is discarded.

A further criterion is based on the free space model of the sensor, which is interpreted as a region within which no obstacles have been measured. In the case of a 2D laser scanner, this could be a polygon, for example, which consists of the position of the laser sensor and the end points of the laser beams. If, for example, an attempt is made to identify a six leg table consisting of six circles in the object model, and it is erroneously assumed to be at a pose at which there is actually a similar table, but with four legs, the model points of two of the legs of the six leg table would lie within the free space model of the sensor (provided that the region is not hidden from the sensor by the object itself). Model points would thus be present at points at which the sensor has not acquired anything. This additional criterion is therefore based on a limit value for the number of points of the model point cloud that are located within the free space model of the sensor. If this limit value is exceeded, the pose hypothesis is discarded.

A further criterion is likewise based on the free space model of the sensor, but considers the maximum penetration depth of a model point into the free space model of the sensor (distance of the point to the contour of the free space model, for points that lie within the free space model). If this limit value exceeds a given limit value, the pose hypothesis is discarded.

A further criterion is based on the ratio of the number of points of the 2D surface contour (model points) of the object to be identified which should in fact be acquired by the distance sensor (expected model points), to the actually acquired points of the 2D point cloud of the environment (observed model points). The expected model points can easily be calculated geometrically, because the pose hypothesis specifies the position of the object model (e.g. based on the CAD model and the model point cloud) relative to the pose of the sensor and, also, the viewing areas of the sensors can be presumed to be known with sufficient accuracy. The expected model points thus include only the model points theoretically visible from this perspective, which excludes the points on the rear side of the model, for example, as well as points from regions that are not visible because they are concealed by the object itself. In order to determine the observed model points, the expected model points are now associated with points of the environment point cloud (instead of, as has been the case previously, the environment points to the model points), whereby again maximum point distances and angle differences are taken into account. An expected model point is then also an observed model point, if it was possible to associate it with a point of the environment point cloud. The ratio of the number of observed model points to expected model points is one, if all the expected model points have been observed, and goes to zero the more the object is covered, for example, by other objects, or the more the actually observed object deviates from the expected object model at this pose. This additional criterion therefore defines a limit value for this ratio and the pose hypothesis is discarded, if this limit value is undershot.

A further criterion is based on the number of observed areas of the object model. To do this, the object model is divided into different regions by the user or each geometric primitive (e.g. circle, polygon, etc.) of the object model is implicitly interpreted as a separate area. When preparing the model point cloud from the object model, the region each model point was generated from is recorded. A region is considered to have been observed if at least one model point linked to it is an observed model point, i.e. when a point of the acquired 2D point cloud can be assigned to the region. This criterion defines a limit value for the number of observed areas and the pose hypothesis is discarded, if the limit value is undershot.

If a pose hypothesis has not been discarded, the object is considered to be acquired at this point. An accepted pose hypothesis then discards similar pose hypotheses which are located within a translational and rotational tolerance range around the accepted pose hypothesis. The thus discarded pose hypotheses do not have to be processed further, which accelerates the subsequent processing steps.

The acquisition method does not return a pose if the object has not been acquired (e.g. because it really does not exist in the scene), and the method can return multiple poses if the object exists more than once in the scene. The same physical object can also be acquired at a number of poses if the object exhibits symmetries. A 90 degree rotationally symmetrical object, for example, is found at four different poses with ideally identical position components but different orientation components.

After the identification of an object or the determination of a pose hypothesis as being correct, the object is preferably tracked using SMC filters, in order to increase the accuracy of the determination of the relative arrangement of the sensor and the object, even in the event of a movement of the two elements relative to one another. SMC filters are also known as particle filters, and allow the exact and continuously updated determination of the location and the velocity of an object. Specifics regarding these methods can, for example, be found in the reference book "Probabilistic Robotics", The MIT Press, 2005.

The invention further relates to an autonomous driverless transport system comprising a system for the identification of objects, which comprises at least one distance sensor and a control device that is configured to execute the above-described methods. The steps to be executed by the control device in particular comprise the retrieval of point pair features of at least one 2D surface contour of an object to be identified from a database, wherein the point pair features are based at least on the distance between the two points of a point pair, and the two angles of the normal (surface normal or curve normal) of each of the points to the distance line between the two points. The database can be integrated in the control device; however, it can also be an external database that can be accessed by the control device. It is indeed preferable for the database with the 2D surface contours of the CAD models to be a central database, or to be synchronized with a central database that can be used by multiple systems. This simplifies the updating or the addition of data from CAD models.

The control device is furthermore configured to acquire at least one 2D point cloud of the environment by means of the distance sensor, and to form corresponding point pair features of the acquired 2D point cloud of the environment. The control device is further configured to compare point pair features of the 2D surface contour with the point pair features of the 2D point cloud of the environment and to determine similar point pair features. Such a comparison can also be performed on a separate computer, for example, that is accessed by the control device. The control device is further configured to be able to determine similar model point pair features and, based on these, preferably in a voting method, to determine pose hypotheses. These can then preferably be optimized in a further step and, after a consistency check, either be accepted or rejected as an acquisition.

The method steps that are executed by the control device substantially correspond to the method steps described above, so that there is no need for a renewed detailed explanation here.

BRIEF DESCRIPTION OF THE FIGURES

The present invention is explained by way of example with reference to the attached figures, in which.

DETAILED DESCRIPTION

Figure 1:
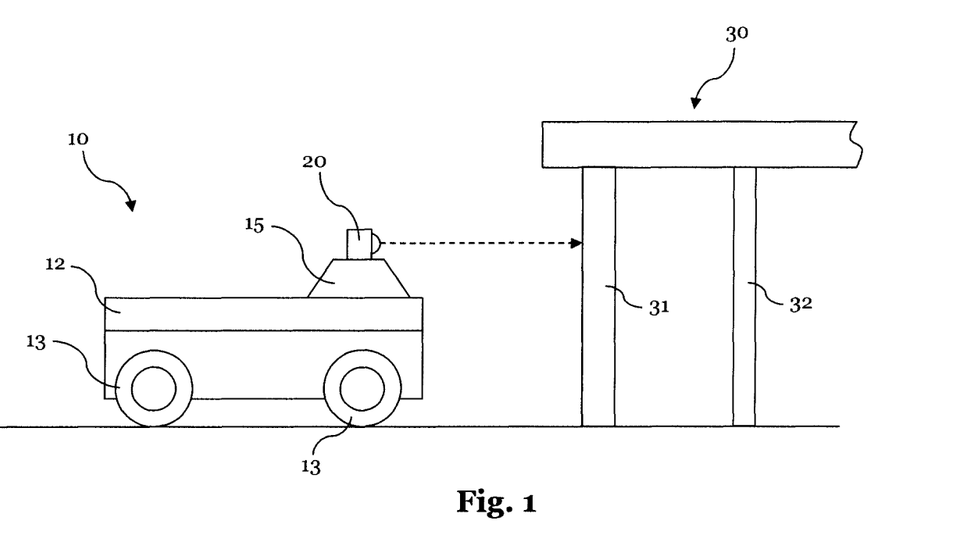
FIG. 1 shows a schematic side view of an autonomous driverless transport system that can execute a method according to the invention.

FIG. 1 shows a schematic side view of an autonomous driverless transport system 10, which has a distance sensor in the form of a 2D laser scanner 20 that is connected to a control device 15. The control device 15 is located on the body 12 of the transport system 10, which can be moved by means of wheels 13. In the vicinity of the transport system 10 there is a table 30 which has a number of legs 31, 32, 33, 34. The intent is for the transport system 10, for example, to approach a specific position relative to the table 30. For this purpose, the transport system 10 requires information that would enable the transport system 10 to perform an autonomous alignment with respect to the table 30. This information can be provided by the method according to the invention.

Figure 2:
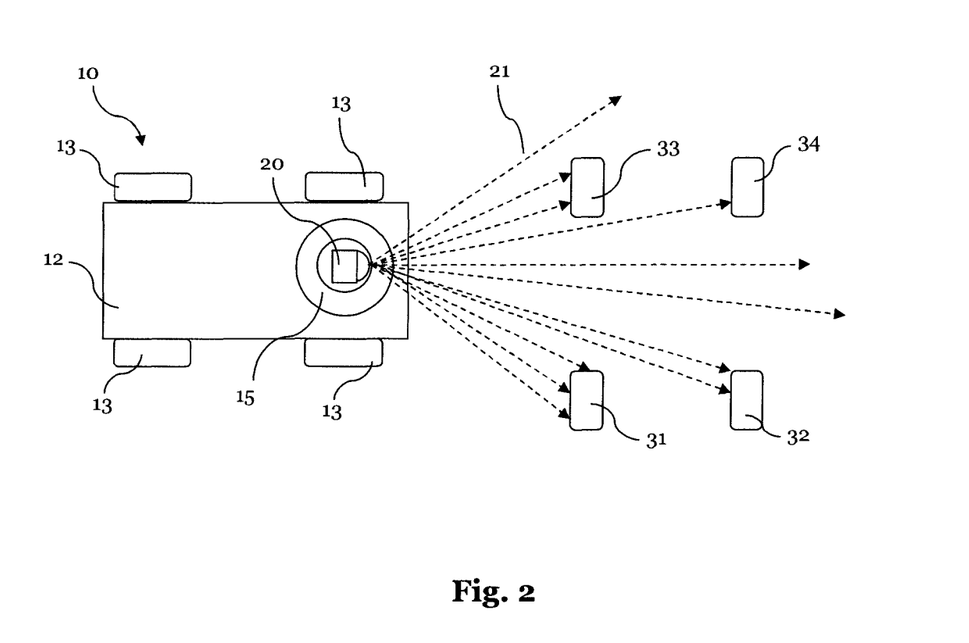
FIG. 2 depicts a plan view onto the arrangement of FIG. 1.

FIG. 2 shows a plan view of the arrangement of FIG. 1. The tabletop 30 of the table is not shown for illustrative purposes, but four legs 31, 32, 33 and 34 can be seen. The 2D laser scanner 20 of the transport system 10 emits a fan of laser beams 21, which are indicated in FIG. 2 with dashed arrows 21. When the laser beams 21 strike an object, such as the legs of the table, the beams are reflected, thus allowing the 2D laser scanner 20, or the associated control device 15, to generate a two-dimensional image of the environment, i.e. a 2D point cloud of the environment. This is explained in more detail below with reference to FIGS. 4 and 5.

Figure 3:
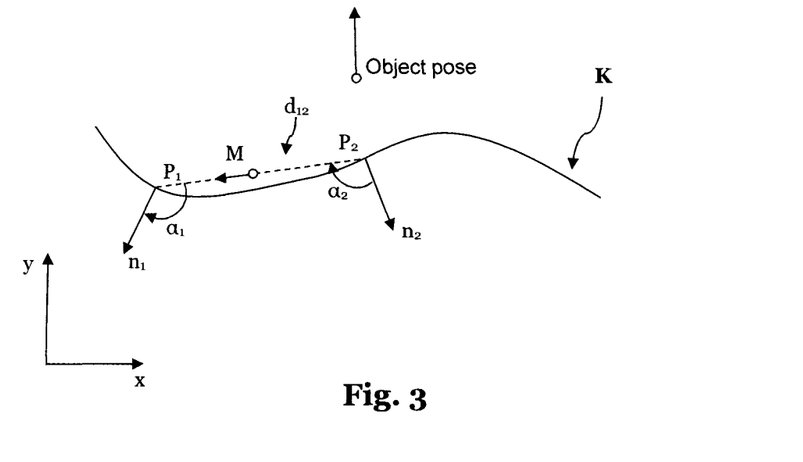
FIG. 3 illustrates an example of the determination of point pair features based on a 2D surface contour.

As an example, the formation of point pair features of a 2D surface contour K will be explained with reference to FIG. 3. The 2D surface contour K corresponds to a two-dimensional curve and can, for example, be generated from a three-dimensional CAD model by placing a two-dimensional section through said CAD model. Two arbitrary points $P_1$ and $P_2$ are now selected from this 2D surface contour, and the normals $n_1$ and $n_2$ of these two points are formed. In addition, the distance and the distance line $d_{12}$ between the two points $P_1$ and $P_2$ is determined. With this data, it is then possible to determine the two angles $\alpha_1$ and $\alpha_2$ of the normals $n_1$ and $n_2$ of the points $P_1$ and $P_2$ to the distance line $d_{12}$. These values of the point pairs $P_1$, $P_2$ together form a point pair feature, i.e. $f=(d_{12}, \alpha_1, \alpha_2)$. A feature pose is preferably defined as well, in which a point M is defined that lies, for example, on the middle of the connecting line $d_{12}$ between the points of the point pair. In addition, a direction vector between M and one of the points of the point pair is defined, as shown by the continuous arrow originating from M in FIGS. 3 and 4. The position component of the feature pose is therefore the point M and the orientation component is the orientation of the direction vector. This allows a unique assignment of each point pair feature to the object pose of the object to be identified. As indicated in FIG. 3, for the point pair feature determined or defined in this way, the object pose (object reference pose) of the object to be identified can be defined or assigned relative to the feature pose. In the two-dimensional space, the x- and the y-distance of the point M from the position of the object pose and the angle between the two direction vectors of the feature pose and the object pose are sufficient for this purpose. Each point pair feature of the 2D surface contour of the object to be identified is thus linked to the respective relative object pose.

This process is repeated for a large number of point pairs on the 2D contour K, for example for several 100 or several 1,000 point pairs. In this way, a plurality of point pair features of the 2D surface contour K are formed, which are ultimately representative of the two-dimensional shape of the surface contour K. In addition, each point pair feature is assigned the respective object pose. If the contour K of the 2D surface contour corresponds to a section through a three-dimensional CAD model, for example, the point pair features determined in this way form a mathematical description of the object to be identified, which can be stored in a database.

In the course of acquiring a 2D point cloud of the environment by means of the 2D laser scanner 20, for example, a plurality of points of the environment are acquired, depending on how many reflective surfaces there are within the range of the distance sensor. Corresponding point pair features are formed for this acquired 2D point cloud of the environment as well, i.e. analogous to the point pair features of the object to be identified, which can then be compared to the point pair features of the object to be identified stored in the database.

Figure 4:
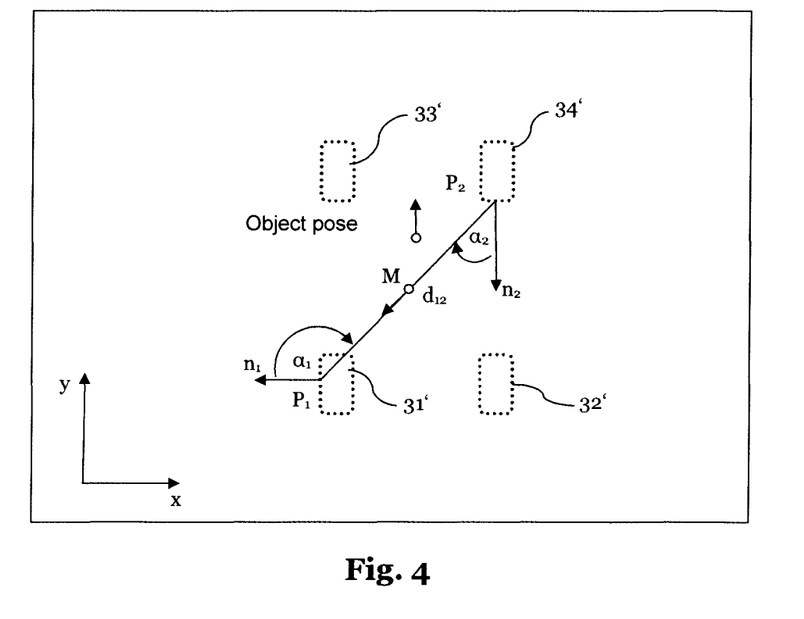
FIG. 4 illustrates the formation of point pair features of the generated 2D surface contour of a CAD model.

In FIG. 4, the dotted rectangles 31', 32', 33', 34' should have been generated from a CAD model of the table 30, whereby the CAD model of the table 30 was cut two-dimensionally at the level of the scanning plane of the 2D laser scanner 20. For this purpose, an object model of the object to be identified in the form of a 2D surface contour was generated from the CAD data, for example, onto which points were then placed at configurable intervals. A comparison with FIG. 2 shows that the dotted contours 31' to 34' correspond to the contours of the legs 31 to 34. The points ultimately permit a comparison with the actual sensor data.

For this purpose, as indicated in FIG. 4 and explained above with reference to FIG. 3, a plurality of point pair features of the contours 31' to 34' are formed on the basis of the 2D surface contour of the table legs. The surface normals $n_1$, $n_2$, as well as the distance $d_{12}$ between the two points $P_1$ and $P_2$ of the respective point pair, are determined for all the points of the pairs. The angles of the surface normals of each point to the connecting line $d_{12}$ between the two points $P_1$ and $P_2$ are then determined, as well as a point M with the associated direction vector. In this example therefore, a point pair feature consists of at least of three values: the distance between the points $P_1$ and $P_2$ ($d_{12}$), and the angles $\alpha_1$ and $\alpha_2$ of the surface normal of each point to the connecting line between the points. In addition, each point pair feature of the 2D surface contour is linked to the respective relative object pose by means of the point M and the direction vector. The data obtained in this way is stored.

Figure 5:
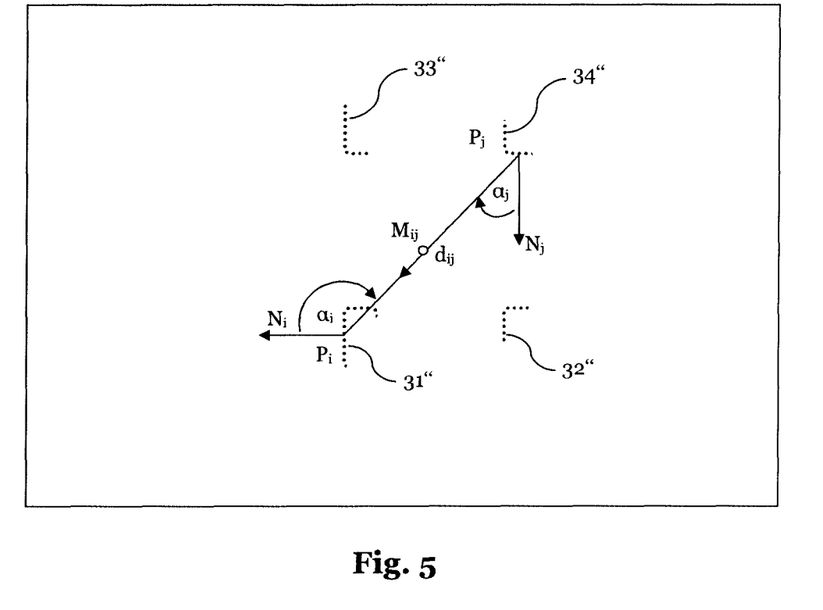
FIG. 5 illustrates the formation of corresponding point pair features of the acquired 2D surface contour.

FIG. 5 schematically shows how the 2D surface contours of the real legs 31 to 34 of the table 30 are acquired by the 2D laser scanner 20 in the form of 2D point clouds. It is obvious to the person skilled in the art that the depiction in FIG. 5 represents a simplification, because, in reality, the 2D laser scanner 20 will acquire many other surface contours of the environment, such as the walls in a factory hall, for example, or other objects that are not part of the table 30. The acquired 2D point clouds 31", 32", 33" and 34" are not identical to the 2D surface contours or model point clouds 31' to 34' derived from the CAD model, because the visual range of the 2D laser scanner is limited and cannot detect the rear sides of the legs 31 to 34, for example. Nonetheless, the similarity of the acquired 2D point clouds 31" to 34" to the 2D surface contours or model point clouds 31' to 34' determined from the CAD model is sufficient. This ultimately makes it possible to determine whether the object to be identified, i.e. the "table 30", has been identified or not. Corresponding point pair features are formed from the acquired 2D point clouds 31" to 34" (in order to distinguish the values necessary for the formation of the point pair features from those of FIG. 4, the values are labeled with i and j in the subscript in FIG. 5). A plurality of point pair features of the acquired 2D point clouds is thus obtained.

In a subsequent step, to determine similar point pair features, the point pair features of the model are compared with the point pair features of the acquired 2D point clouds. Since, in practice, the 2D laser scanner 20 has acquired more contours than those shown in FIG. 5, the point pair features of the acquired 2D point clouds of the environment include a large number of point pair features that differ greatly from the point pair features of the model, because the distance $d_{ij}$, for example, is many times greater than the largest possible distance $d_{12}$ from the CAD model.

In the present example, for the determination of similar point pair features, use can also be made of the fact that the distance $d_{12}$ always has to be within certain ranges. This is because the two points $P_1$, $P_2$ of a pair are either located on the same contour, e.g. both on the contour 31', or they are located on or in different contours. If they are located in different contours, the distance $d_{12}$ has to approximately correspond to (1.) the distance between the two contours 31' and 32', or (2.) the distance between the contours 31' and 33', or (3.) the distance between the contours 31' and 34'. In the example shown, the distance $d_{12}$ of all point pair features of the 2D surface contour of the model must therefore lie within one of four exactly definable ranges. Point pair features of the acquired 2D point clouds of the environment, in which the distance $d_{ij}$ is far from these four ranges can be rejected immediately as non-similar.

FIGS. 6 to 10 schematically illustrate the procedure for the consistency check, i.e. after the (probable) pose hypotheses resulting from the above-described methods, for example, have been determined. The consistency check is intended to make the procedure for determining whether the object to be identified has been correctly identified or not more precise and more reliable. In the consistency check, previously determined pose hypotheses are tested so as to be able to detect and reject false hypotheses. The consistency checks explained in more detail below can respectively be used alone or in combination. In the following, it is assumed that the object model has been transformed to the pose of the respective pose hypothesis currently to be tested (or vice versa), and the points of the environment point cloud have been associated with the points of the transformed 2D surface contour, or the corresponding model point cloud.

Figure 6:
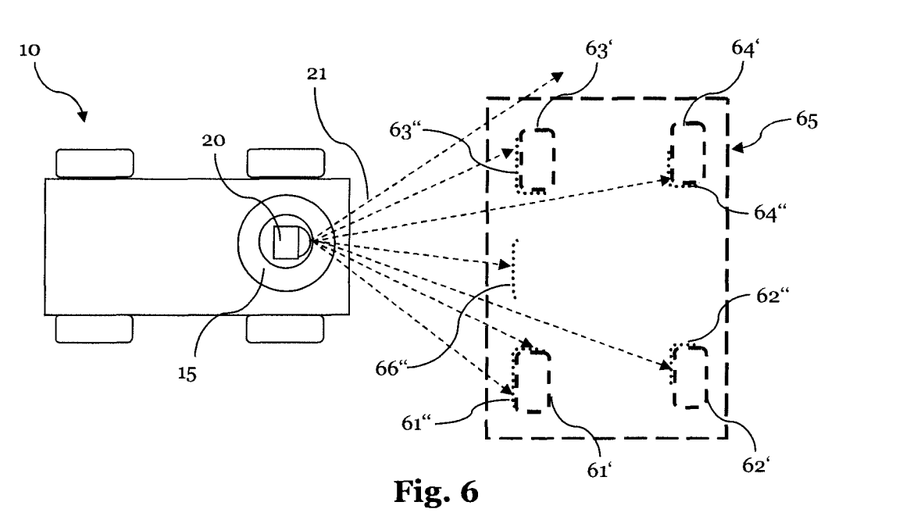
FIG. 6 schematically illustrates the procedure for the consistency check on the basis of the free space model of the object.

FIG. 6 schematically illustrates the procedure for the consistency check based on the free space model of the object. In the situation shown, on the basis of the acquired laser points 61", 62", 63", 64", a table with four legs is suspected to be at a specific position (hypothesis). The model point clouds 61', 62', 63', 64' have been generated as in the example of FIG. 4, for example from a CAD model of the table. In reality there is a table with six legs at that position, so that additional points are acquired at the position indicated by the reference sign 66". The object model of the suspected 4 leg table consists of the four model point clouds 61', 62', 63', 64' of the table legs and, in the example shown, the free space model of the object is a rectangle 65 that encompasses the four model point clouds 61', 62', 63', 64'. No other points may be acquired by the sensor within the free space model 65, or a limit value is defined for the number of points of the environment cloud that are within the free space model 65, but cannot be assigned to one of the four model point clouds 61', 62', 63', 64'. The additionally acquired point cloud 66" is therefore acquired at a position in the free space model 65, at which there should actually not be any points to be acquired. The pose hypothesis, that there is a table with four legs at the position scanned by the sensor 20, is therefore discarded as false.

Figure 7:
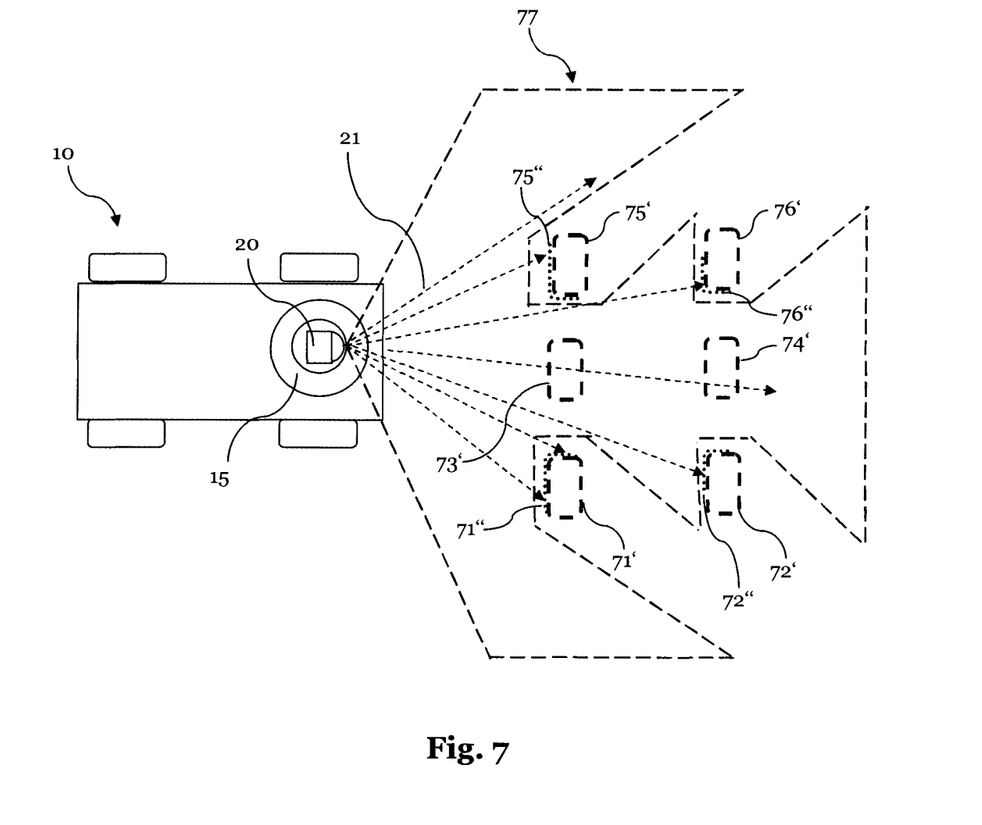
FIG. 7 schematically illustrates the procedure for the consistency check on the basis of the free space model of the sensor.

FIG. 7 schematically shows the procedure for the consistency check based on the free space model of the sensor. In this situation, a table with six legs is suspected to be at a position (pose hypothesis) at which there is actually a table with four legs. The pose hypothesis is therefore false. The free space region 77 of the sensor is a region in which no environment points have been acquired/measured. The six model point clouds 71', 72', 73', 74', 75', 76' are in turn generated from a CAD model of the 6 leg table, for example. Based on the acquired laser points 71", 72", 75", 76", a table with six legs is thus suspected to be at a specific position; in the free space model 77 of the sensor, however, there are model point clouds 73' and 74' that cannot be associated with a laser point. Therefore, there are model points or model point clouds at positions in which the sensor has not acquired anything. If the number of these model points exceeds a specific limit value, the pose hypothesis is discarded.

Figure 8:
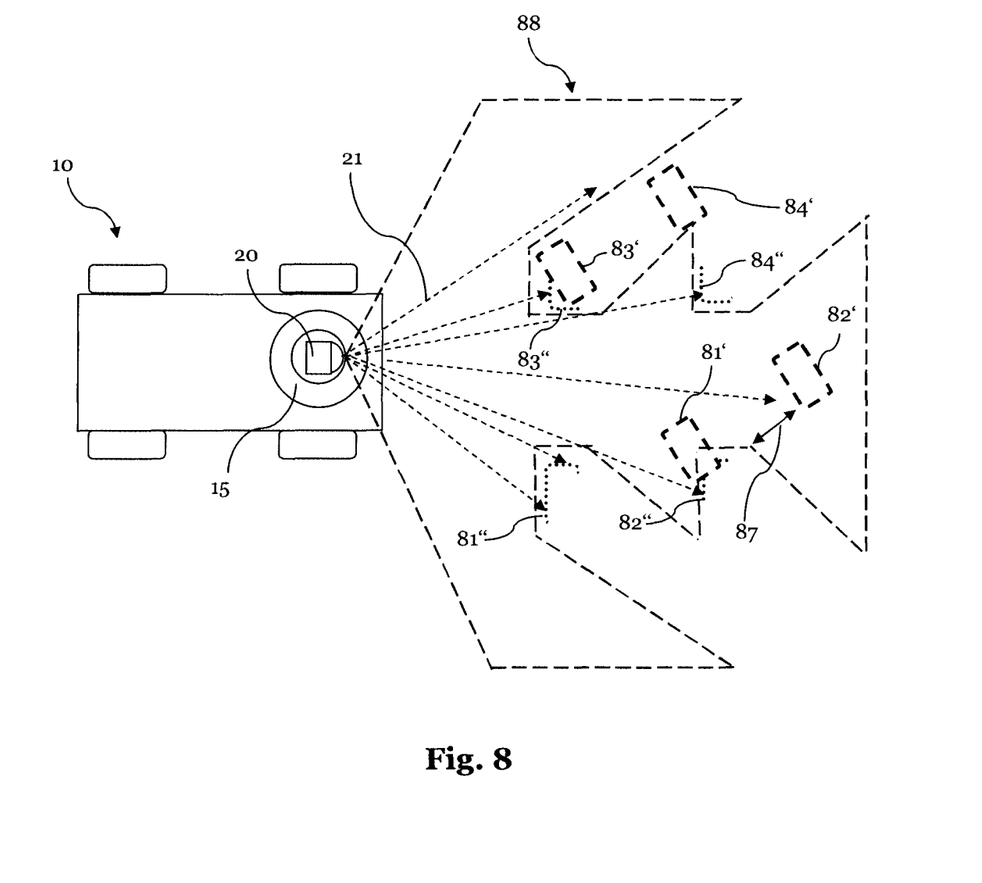
FIG. 8 schematically illustrates the procedure for the consistency check on the basis of the free space model of the sensor and the penetration depth of a model point.

FIG. 8 schematically shows the procedure for the consistency check based on the free space model of the sensor and the penetration depth of a model point. In the situation shown, a 4 leg table is suspected at a position that deviates from the actual position or pose of an actually present 4 leg table. The actual position is shown by means of the acquired point clouds 81", 82", 83", 84" in FIG. 8. The pose hypothesis to be tested, however, suspects the table to be at the position shown by means of the model point clouds 81', 82', 83' and 84' in FIG. 8. Similarly to the procedure for the example of FIG. 7, limit values for model points are considered here, which lie within the free space model 88 of the sensor. In doing so, however, the distance 87 between individual model points within the free space model 88 and the boundaries of the free space model 88 is important. If the distance 87 exceeds a specific limit value, the pose hypothesis is discarded. If, however, the model points are located close to the boundary of the free space model 88, for example, the pose hypothesis can under certain circumstances be considered to be correct.

Figure 9:
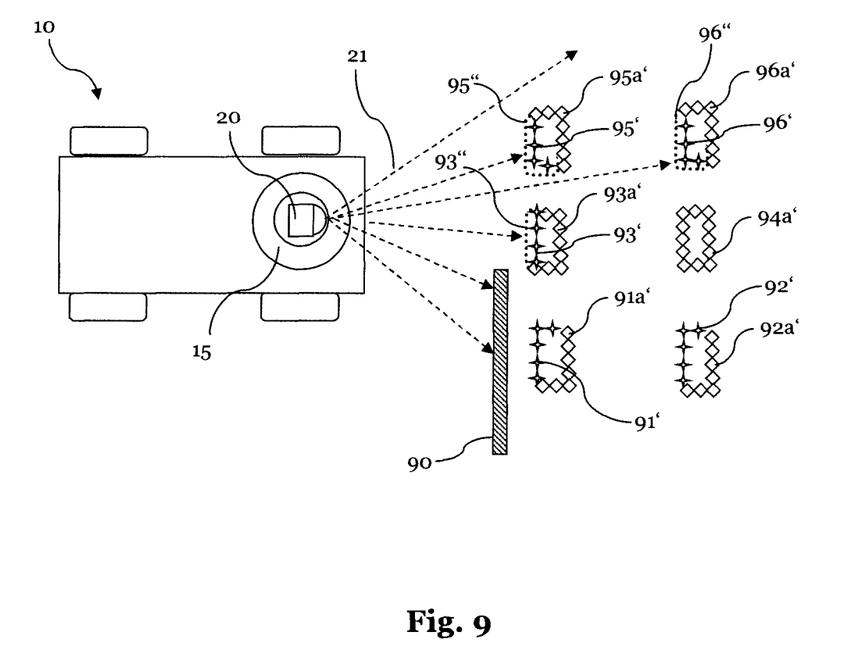
FIG. 9 schematically illustrates the procedure for the consistency check on the basis of a comparison of expected and actually observed model points.

FIG. 9 schematically shows the procedure for the consistency check based on a comparison of expected and actually observed model points. This approach is based on the ratio of the number of points of the 2D surface contour of the object to be identified that should in fact be acquired by the distance sensor (expected model points), to the actually acquired points of the 2D point cloud of the environment (observed model points). In the example shown, a 6 leg table is suspected to be at a position (pose hypothesis) at which there is actually a 6 leg table. The pose hypothesis is therefore correct. However, two legs of the table are concealed by an obstacle 90. Model points 91a', 92a', 93a', 94a', 95a' and 96a' can be determined from the geometric calculation, that are not expected to be able to be acquired by the sensor, because, from the view of the sensor 20, they are located on the rear side of a table leg (such as 91a', 92a', 93a', 95a' and 96a') for example, or because they are concealed by another table leg (such as 94a'). A number of model points 91', 92', 93', 95' and 96' are additionally determined, which should actually be acquired by the sensor. In the case of 93", 95" and 96", the sensor does indeed acquire points at positions in which it is expected. At positions 91' and 92', however, the sensor does not acquire any points due to the obstacle 90, even though it is expected. The consistency check is then based, for example, on the ratio of the expected and the actually observed model points 93", 95" and 96" to the total number of expected points.

Figure 10:
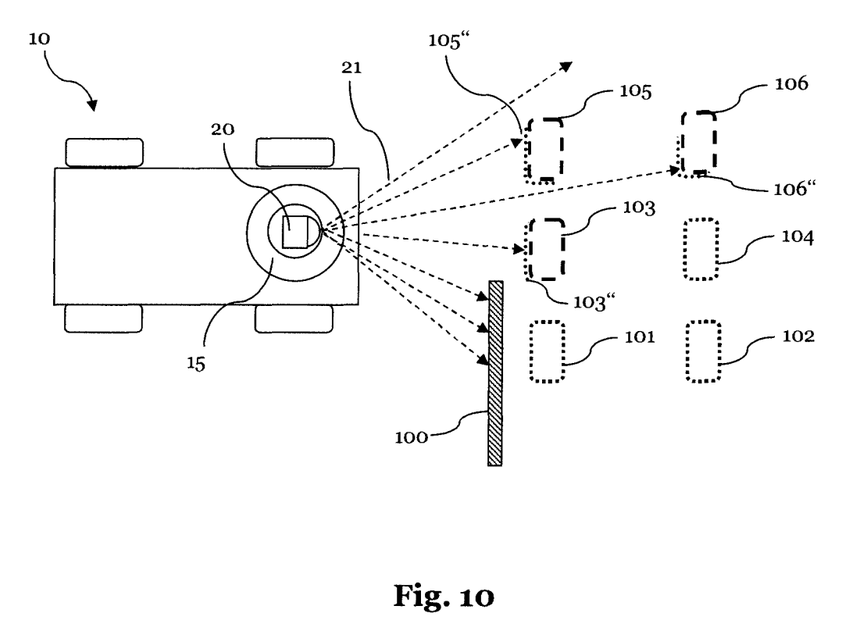
FIG. 10 schematically illustrates the procedure for the consistency check on the basis of the observed regions of the object model.

FIG. 10 schematically shows the procedure for the consistency check based on the observed areas of the object model. In the example shown, a 6 leg table is again suspected to be at a position (pose hypothesis) at which there is actually a 6 leg table. The pose hypothesis is therefore correct. However, two table legs are concealed by an obstacle 100, so that the sensor 20 cannot acquire them, and a further leg is not acquired because it is concealed by another leg. Points are therefore acquired only at the positions 103", 105" and 106". In the example shown, the object model is divided by the user into six rectangular regions 101, 102, 103, 104, 105, 106, and each of these rectangles of the object model is considered as a separate region. When preparing the model point cloud from the object model, the region each model point was generated from is recorded. A range is considered to have been observed if at least one model point linked to it is an observed model point, i.e. if a point of the acquired 2D point cloud can be assigned to the region. In the example of FIG. 10, the regions 103, 105 and 106 have been acquired, namely by the point clouds 103", 105" and 106", whereas the regions 101, 102 and 104 have not been acquired. The pose hypothesis can be discarded, for example, if a specific limit value for the number of observed regions is undershot.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

LIST OF REFERENCES

| | |
|---|---|
| 10 | Autonomous driverless transport system |
| 12 | Body |
| 13 | Wheels |
| 15 | Control device |
| 20 | Distance sensor/laser scanner |
| 21 | Laser beams |
| 30 | Table |
| 31, 32, 33, 34 | Legs |
| 31', 32', 33', 34' | 2D surface contour or point cloud from CAD model |
| 31", 32", 33", 34" | Sensor-acquired 2D point clouds |
| 61', 62', 63', 64' | 2D surface contour or point cloud from CAD model |
| 61", 62", 63", 64", 66" | Sensor-acquired 2D point clouds |
| 65 | Free space model of the object |
| 71', 72', 73', 74', 75', 76' | 2D surface contour or point cloud from CAD model |
| 71", 72", 75", 76" | Sensor-acquired 2D point clouds of the legs |
| 77 | Free space model of the sensor |
| 81', 82', 83', 84' | 2D surface contour or point cloud of the legs from CAD model |
| 81", 82", 83", 84" | Sensor-acquired 2D point clouds |

| | |
|---|---|
| 88 | Free space model of the sensor |
| 87 | Distance boundary free space model and model point |
| 91', 92', 93', 95', 96' | Model points expected to be able to be acquired by the sensor |
| 91a', 92a', 93a' . . . 96a' | Model points not expected to be able to be acquired by the sensor |
| 93", 95", 96" | Expected and acquired model points |
| 90, 100 | Obstacle |
| 101, 102, 103 . . . 106 | Regions of the object model |
| 103", 105", 106" | Sensor-acquired 2D point clouds |

What is claimed is:

1. A method for controlling at least one of a robot or an autonomous driverless transport system having a control device for actuating movement of the robot or autonomous driverless transport system, the method comprising:
obtaining with the control device an object model of an object to be identified, wherein the object model is in the form of a two-dimensional (2-D) surface contour;
forming point pair features based on the 2-D surface contour, wherein the point pair features are based at least on a distance between two points of a respective point pair, and two angles, wherein each angle is defined by a respective angle between a line normal to the contour at a respective one of the two points and a line connecting the two points;
detecting at least one 2-D point cloud of the environment using a distance sensor, and forming corresponding point pair features of the detected 2-D point cloud of the environment;
comparing the point pair features of the 2-D surface contour with the point pair features of the 2-D point cloud of the environment and determining similar point pair features;
determining whether the object to be identified has been identified based on the point pair features that were determined to be similar;
determining pose hypotheses of the object to be identified on the basis of the point pair features determined to be similar;
wherein determining whether the object to be identified has been identified comprises performing a consistency check of the pose hypotheses; and
controlling actuation of at least one of the robot or the autonomous driverless transport system with the control device in response to identifying the object;
wherein performing the consistency check comprises:
transforming the object model to the determined pose hypotheses and associating points of the point cloud of the environment with points of the 2-D surface contour, then at least one of:
determining the number of points of a transformed 2-D point cloud of the environment which are located within a free space model of the object and which could not be associated with model points,
determining the number of points of the 2-D surface contour which are located within a free space model of the sensor,
determining the distances of points of the 2-D surface contour to the boundary of the free space model of the sensor for points of the 2-D surface contour which lie within the free space model of the sensor,
determining a ratio of the number of points of the 2-D surface contour of the object to be identified which should be acquired by the distance sensor to the number of actually acquired points of the 2-D point cloud of the environment, or
dividing the object model into different regions, recording which area each model point was generated from, and determining the number of acquired regions in the object model.

2. The method of claim 1, further comprising allocating a feature pose to each point pair feature of the 2-D surface contour, wherein the feature pose links the respective point pair feature with a relative pose of the object to be identified.

3. The method of claim 1, wherein comparing the point pair features comprises determining pose hypotheses of the object to be identified on the basis of the point pair features that were determined to be similar.

4. The method of claim 3, further comprising:
allocating a feature pose to each point pair feature of the 2-D surface contour wherein the feature pose links the respective point pair feature with a relative pose of the object to be identified;
wherein determining the pose hypotheses includes transforming the feature pose of the point pair features of the 2-D surface contour to the feature pose of the point pair features of the 2-D point cloud of the environment.

5. The method of claim 3, further comprising:
entering the pose hypotheses into a voting grid, wherein the voting grid is implemented as a hash table; and
selecting at least one pose hypothesis.

6. The method of claim 5, wherein the at least one pose hypothesis is selected from a grid cell with the largest number of recorded pose hypotheses.

7. The method of claim 6, wherein the determination of whether the object to be identified was identified is based on the selected pose hypotheses, and wherein the other pose hypotheses of the same voting grid are not taken into consideration.

8. The method of claim 5, wherein the pose hypotheses entered in the voting grid are based on point pair features of the 2-D point cloud of the environment that all originate from exactly one point.

9. The method of claim 8, further comprising:
determining pose hypotheses that are based on point pair features of the 2-D point cloud of the environment originating from a different point; and
repeating the voting procedure.

10. The method of claim 1, wherein comparing the point pair features further comprises:
determining pose hypotheses of the object to be identified on the basis of the point pair features determined to be similar; and
optimizing the determined pose hypotheses using an Iterative Closest Point (IPC) algorithm.

11. The method of claim 2, wherein allocating a feature pose to each point pair feature of the 2-D surface contour comprises:
defining a point on the connecting line between the two points of the point pair;
defining a direction vector originating from the point; and
linking the direction vector with the relative pose of the object to be identified.

12. The method of claim 1, wherein the distance sensor is a laser scanner.

13. The method of claim 12, wherein the laser scanner is a 2-D laser scanner.

14. The method of claim 3, further comprising:
tracking the identified object using Sequential Monte Carlo (SMC) filters in response to determining that the object has been identified, or that the determination of a pose hypothesis is correct.

15. An autonomous driverless transport system, comprising:
an autonomous driverless transport vehicle; and
an arrangement for identifying objects, the arrangement comprising at least one distance sensor and a control device configured to execute the following steps:
retrieve from a database point pair features of at least one 2-D surface contour of an object to be identified, wherein the point pair features are based at least on a distance between two points of a respective point pair, and two angles, wherein each angle is defined by a respective angle between a line normal to the contour at a respective one of the two points and a line connecting the two points;
detect of at least one 2-D point cloud of the environment using the at least one distance sensor, and form corresponding point pair features of the detected 2-D point cloud of the environment;
compare the point pair features of the 2-D surface contour with the point pair features of the 2-D point cloud of the environment and determine similar point pair features;
determine whether the object to be identified has been identified based on the point pair features that were determined to be similar; and
determine pose hypotheses of the object to be identified on the basis of the point pair features determined to be similar;
wherein determining whether the object to be identified has been identified comprises performing a consistency check of the pose hypotheses by:
transforming the object model to the determined pose hypotheses and associating points of the point cloud of the environment with points of the 2-D surface contour, then at least one of:
determining the number of points of a transformed 2-D point cloud of the environment which are located within a free space model of the object and which could not be associated with model points,
determining the number of points of the 2-D surface contour which are located within a free space model of the sensor,
determining the distances of points of the 2-D surface contour to the boundary of the free space model of the sensor for points of the 2-D surface contour which lie within the free space model of the sensor,
determining a ratio of the number of points of the 2-D surface contour of the object to be identified which should be acquired by the distance sensor to the number of actually acquired points of the 2-D point cloud of the environment, or
dividing the object model into different regions, recording which area each model point was generated from, and determining the number of acquired regions in the object model; and
control the autonomous driverless transport vehicle in response to identifying the object.

16. The autonomous driverless transport system of claim 15, wherein the control device is further configured to allocate a feature pose to each point pair feature of the 2-D surface contour, wherein the feature pose links the respective point pair feature with a relative pose of the object to be identified.

* * * * *